(12) United States Patent
Mariswamy et al.

(10) Patent No.: US 10,234,855 B2
(45) Date of Patent: Mar. 19, 2019

(54) APPARATUS AND METHOD FOR RATIONALIZING AND RESOLVING ALARMS IN INDUSTRIAL PROCESS CONTROL AND AUTOMATION SYSTEMS

(71) Applicant: Honeywell International Inc., Morris Plains, NJ (US)

(72) Inventors: Archana Mariswamy, Coimbatore (IN); Ilangovan Rajaram, Bangalore (IN); Srikant Srinivasan, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 57 days.

(21) Appl. No.: 15/489,362

(22) Filed: Apr. 17, 2017

(65) Prior Publication Data

US 2018/0299875 A1 Oct. 18, 2018

(51) Int. Cl.
*G05B 23/02* (2006.01)
*G05B 13/04* (2006.01)

(52) U.S. Cl.
CPC ......... *G05B 23/027* (2013.01); *G05B 13/041* (2013.01)

(58) Field of Classification Search
CPC .............................. G05B 23/027; G05B 13/041
See application file for complete search history.

(56) References Cited

U.S. PATENT DOCUMENTS

| | | | | |
|---|---|---|---|---|
| 9,116,519 B2 * | 8/2015 | Mello | ................. | G08B 29/185 |
| 2008/0300698 A1 | 12/2008 | Havekost et al. | | |
| 2010/0004759 A1 * | 1/2010 | Scott | ................. | G05B 23/0216 700/12 |
| 2010/0274367 A1 | 10/2010 | Kaufman et al. | | |
| 2011/0054334 A1 * | 3/2011 | Fischell | ............... | A61B 5/0402 600/509 |

(Continued)

FOREIGN PATENT DOCUMENTS

WO 2015019077 A1 2/2015

OTHER PUBLICATIONS

Arjomandi, R., et al., "Development of an Efficient Alarm Management Package for an Industrial Process Plant," 2011 Chinese Control and Decision Conference (CCDC), 2011, pp. 1875-1880.

(Continued)

*Primary Examiner* — Vincent H Tran (57) ABSTRACT

A method includes obtaining one or more modified properties associated with at least one of an alarm to be generated by an industrial process control and automation system and a process controller within the industrial process control and automation system. The method also includes obtaining historical data associated with actual operation of the control and automation system. The method further includes simulating operation of one or more components of the control and automation system using the one or more modified properties. The method also includes identifying one or more simulated alarms generated during the simulated operation of the one or more components using the one or more modified properties. In addition, the method includes outputting the one or more simulated alarms. The method could also include receiving one or more approvals of the one or more modified properties and providing the one or more modified properties to the process controller.

21 Claims, 2 Drawing Sheets

(56) References Cited

U.S. PATENT DOCUMENTS

| | | | |
|---|---|---|---|
| 2012/0218111 A1* | 8/2012 | Batchelder | A61B 5/14551 340/573.1 |
| 2013/0191106 A1 | 7/2013 | Kephart et al. | |
| 2014/0336984 A1* | 11/2014 | Starr | G05B 23/0297 702/183 |
| 2015/0066163 A1 | 3/2015 | Sunderam | |
| 2018/0158314 A1* | 6/2018 | Larsson | G08B 29/186 |

OTHER PUBLICATIONS

Ayouri, M., et al., "Robust Identification of Hydrocarbon Debutanizer Unit Using Radial Basis Function Neural Networks (RBFNNs)," Journal of Automation and Control, vol. 3, No. 1, Jan. 13, 2015, pp. 10-17.

Bakke, M., et al., "A Simulated Debutanizer Case Study for Teaching Advanced Process Control," NTNU Department of Engineering Cybernetics, 2008, 70 pages.

"DynAMo™ Alarm Suite R100," Advanced Solutions, Honeywell, Nov. 2013, 2 pages.

DynAMo Metrics & Reporting R120.1, Software Change Notice, Document ID: DMO-MRSCN-120.1, Honeywell, Oct. 14, 2015, 16 pages.

"Unisim® Design, The Ultimate Tool for the Ultimate Engineer," Honeywell, Connected Plant, 2016, 3 pages.

"Unisim® Design Suite R440," Honeywell, Apr. 2015, 4 pages.

King, M., et al., "Process Control A Practical Approach," Whitehouse Consulting, Isle of Wright, UK, 2011, pp. 289-299.

"Practical: Plant Handbook," http://www.separationprocesses.com/CourseWare/Experiments/DT_Prac05a.htm, Mar. 2004, 18 pages.

Willis, M.J., et al., "Selecting a Distillation Column Control Strategy," Department of Chemical and Process Engineering, University of Newcastle, Dec. 1999-Mar. 2000, 12 pages.

International Search Report and Written Opinion regarding International Application No. PCT/US2018/026825, dated Jul. 20, 2018, 9 pages.

* cited by examiner

APPARATUS AND METHOD FOR RATIONALIZING AND RESOLVING ALARMS IN INDUSTRIAL PROCESS CONTROL AND AUTOMATION SYSTEMS

TECHNICAL FIELD

This disclosure generally relates to industrial process control and automation systems. More specifically, this disclosure relates to an apparatus and method for rationalizing and resolving alarms in industrial process control and automation systems.

BACKGROUND

Industrial process control and automation systems are often used to automate large and complex industrial processes. These types of systems routinely include a large number of devices, such as sensors, actuators, and controllers. Some of the controllers are often used to receive measurements from the sensors and perform process control operations to generate control signals for the actuators. Other controllers are often used to perform higher-level functions, such as planning, scheduling, and optimization operations.

Controllers or other devices in these types of systems are typically designed to generate alarms for human operators when undesirable or unsafe operating conditions are detected. "Alarm management" refers to a process by which these alarms are designed, monitored, and managed to ensure safe and reliable operations of an industrial facility. With the introduction of distributed control systems (DCSs) and automation for industrial facilities, it has become possible to monitor a large number of parameters in an industrial facility. However, this has also led to the ability to generate an enormous number of alarms, which can quickly become problematic for human operators. For example, the presence of an excessive number of alarms may allow important alarms to go unnoticed by the human operators.

SUMMARY

This disclosure provides an apparatus and method for rationalizing and resolving alarms in industrial process control and automation systems.

In a first embodiment, a method includes obtaining one or more modified properties associated with at least one of (i) an alarm to be generated by an industrial process control and automation system and (ii) a process controller within the industrial process control and automation system. The method also includes obtaining historical data associated with actual operation of the industrial process control and automation system. The method further includes simulating operation of one or more components of the industrial process control and automation system using the one or more modified properties. The method also includes identifying one or more simulated alarms generated during the simulated operation of the one or more components using the one or more modified properties. In addition, the method includes outputting the one or more simulated alarms.

In a second embodiment, an apparatus includes at least one memory and at least one processing device. The at least one memory is configured to store one or more modified properties associated with at least one of (i) an alarm to be generated by an industrial process control and automation system and (ii) a process controller within the industrial process control and automation system. The at least one memory is also configured to store historical data associated with actual operation of the industrial process control and automation system. The at least one processing device is configured to simulate operation of one or more components of the industrial process control and automation system using the one or more modified properties. The at least one processing device is also configured to identify one or more simulated alarms generated during the simulated operation of the one or more components using the one or more modified properties and output the one or more simulated alarms.

In a third embodiment, a non-transitory computer readable medium contains computer readable program code that when executed causes at least one processing device to obtain one or more modified properties associated with at least one of (i) an alarm to be generated by an industrial process control and automation system and (ii) a process controller within the industrial process control and automation system. The medium also contains computer readable program code that when executed causes the at least one processing device to obtain historical data associated with actual operation of the industrial process control and automation system. The medium further contains computer readable program code that when executed causes the at least one processing device to simulate operation of one or more components of the industrial process control and automation system using the one or more modified properties. The medium also contains computer readable program code that when executed causes the at least one processing device to identify one or more simulated alarms generated during the simulated operation of the one or more components using the one or more modified properties. In addition, the medium contains computer readable program code that when executed causes the at least one processing device to output the one or more simulated alarms.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, with the introduction of distributed control systems (DCSs) and automation for industrial facilities, it has become possible to monitor a large number of parameters in an industrial facility. However, this has also led to the ability to generate an enormous number of alarms, which can quickly become problematic for human operators who need to monitor and resolve those alarms. One example technique for dealing with this issue is called "alarm rationalization." In alarm rationalization, alarms can be examined, and the alarms may be redesigned or filters may be put into place so that only desired alarms (such as more important alarms) are generated or provided to human operators. Unfortunately, the effectiveness of alarm rationalization often depends on the skill level and experience of the person performing the alarm rationalization. Alarm rationalization also has the potential to inadvertently suppress desired alarms that might be required or useful to human operators, which could create safety or other issues.

This disclosure describes techniques in which alarm management is used in conjunction with process simulation. When a user wishes to change one or more properties of an alarm or a component that generates an alarm (such as for alarm rationalization purposes), a simulator is used to simulate how a control and automation system would have functioned using the altered properties. The user is able to see how alarms would be generated using those altered properties, which allows the user to determine if the altered properties provide acceptable behavior. If necessary, the user can make additional alterations to the properties. Once the user is satisfied, the user can deploy the altered properties to the control and automation system for use in generating future alarms.

In this way, engineers or other personnel are able to see how changes in a control and automation system would affect the alarms generated by that system before the changes are actually placed into use. The engineers or other personnel can therefore gain more confidence that the changes are suitable for use while controlling industrial processes. Moreover, because the changes can be made more effectively using these techniques, alarm rationalization can be performed more effectively. As a result, the number of alarms generated by a control and automation system can be reduced, which allows human operators to focus on and respond to those alarms that are more important.

Figure 1:
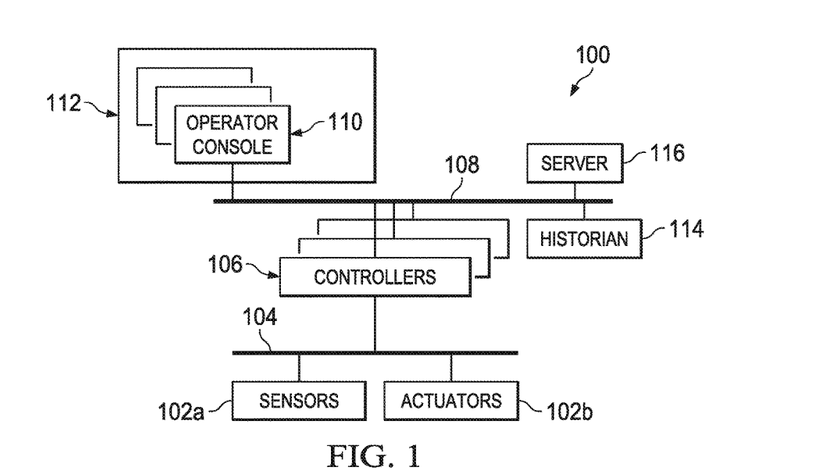
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, or flow rate. Also, the actuators 102b could alter a wide variety of characteristics in the process system.

Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and alarms associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes, such as actual alarms. The historian 114 includes any suitable structure for storing and facilitating retrieval of information. Although shown as a single component here, the historian 114 could be located elsewhere in the system 100, or multiple historians could be distributed in different locations in the system 100. Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system.

Various devices shown in FIG. 1 can generate alarms for users, such as when the controllers 106 generate alarms when values of process variables associated with an industrial process are outside of their respective limits. Industrial processes are typically associated with hundreds or thousands of process variables, which can include controlled, manipulated, and disturbance variables. A controlled variable generally denotes a variable whose value can be measured or inferred and that is controlled to be at or near a desired setpoint or within a desired range. A manipulated variable generally denotes a variable that can be altered in order to adjust one or more controlled variables. A disturbance variable generally denotes a variable whose value can be considered but not controlled when determining how to adjust one or more manipulated variables to achieve desired changes to one or more controlled variables.

As described in more detail below, one or more of the components in FIG. 1 (such as the operator consoles 110 or the server 116) provide an alarm management tool that operates in conjunction with a process simulator. The alarm management tool can receive actual alarms from devices within the system 100. The process simulator performs simulations so that a user can determine whether one or more changes to an alarm or to a component that generates an alarm are acceptable, such as by comparison of simulated alarms to actual alarms. Once approved, the one or more changes are pushed to one or more controllers 106 or other components for use in the system 100.

Although FIG. 1 illustrates one example of an industrial process control and automation system 100, various changes may be made to FIG. 1. For example, the system 100 could include any number of sensors, actuators, controllers, networks, operator stations, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where alarm management and simulation can be used to support alarm rationalization and resolution. This functionality can be used in any other suitable system.

Figure 2:
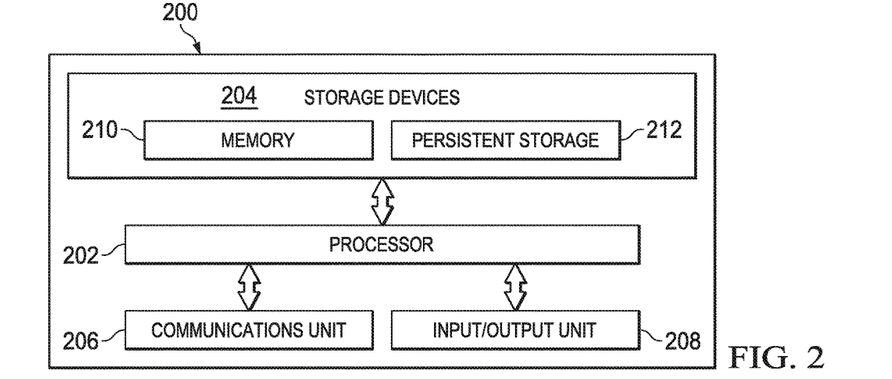
FIG. 2 illustrates an example device supporting the rationalization and resolution of alarms in an industrial process control and automation system according to this disclosure.

FIG. 2 illustrates an example device 200 supporting the rationalization and resolution of alarms in an industrial process control and automation system according to this disclosure. For ease of explanation, the device 200 may be described as being used in the system 100 of FIG. 1. The device 200 could, for example, denote an operator console 110 or server 116 in FIG. 1. However, the device 200 could be used in any other suitable system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could implement the alarm management and simulation functionality described in this patent document. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network (such as the network 108). The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 supporting the rationalization and resolution of alarms in an industrial process control and automation system, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
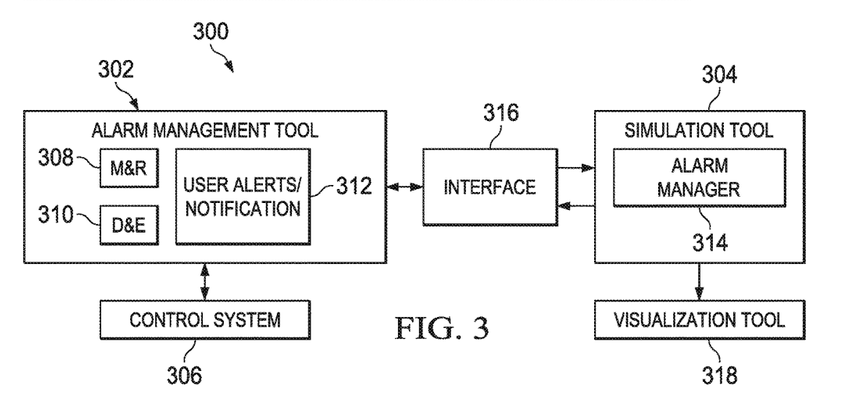
FIG. 3 illustrates an example functional architecture supporting the rationalization and resolution of alarms in an industrial process control and automation system according to this disclosure.

FIG. 3 illustrates an example functional architecture 300 supporting the rationalization and resolution of alarms in an industrial process control and automation system according to this disclosure. For ease of explanation, the architecture 300 may be described as being implemented using the device 200 of FIGURE in the system 100 of FIG. 1. The architecture 300 could, for example, be supported by an operator console 110 or server 116 in FIG. 1. However, the architecture 300 could be used by any other suitable device and in any other suitable system.

As shown in FIG. 3, the architecture 300 includes an alarm management tool 302 and a simulation tool 304. The alarm management tool 302 generally denotes a software tool or other logic that is used to manage the alarms that are generated in a control system 306 (which could denote the system 100 of FIG. 1). For example, the alarm management tool 302 could allow users to define the properties of alarms, such as the condition(s) to be met for an alarm to be generated, the priority of the alarm when generated, and the recipient(s) of an alarm. The alarm management tool 302 can be used by users to develop an effective alarm strategy to improve safety, availability, or profitability in the control system 306. The alarm management tool 302 includes any suitable logic for managing alarms generated in a control system. The alarm management tool 302 could, for instance, denote the DYNAMO software suite from HONEYWELL INTERNATIONAL INC.

In this particular example, the alarm management tool 302 includes various functions 308-312 that support different operations of the alarm management tool 302. A metrics and reporting (M&R) function 308 is used to collect alarm and event data from various data sources in the control system 306 and to present this information to users. Reports can be generated using this information, and the reports can be used to gain insight into a facility's performance and issues in its alarm systems. The M&R function 308 can also be used to visually compare alarm metrics against industry standards and identify deviations. Among other things, the M&R function 308 can be used to help reduce or eliminate nuisance alarms, ensure compliance, and improve analysis of alarms and events.

A documentation and enforcement (D&E) function 310 is used to help drive and sustain improvements in alarm management. For example, the D&E function 310 can be used to capture documentation, configuration, and rationalization data for alarms. This information can be used to help maintain engineered configurations over the lifecycle of equipment in the control system 306. This information can also be used to ensure that alarms are consistent with operating conditions of a facility.

A user alert/notification function 312 is used to generate alerts or other notifications for users, possibly before alarms are triggered in the control system 306. This may allow, for example, users to define notifications that can help improve situational awareness over an industrial process without adding unnecessary alarms to the actual control system 306. Near-real time alerts and other notifications could be generated to identify when process data is outside of specified limits, which can provide an early indication of a problem before an alarm is justified.

The simulation tool 304 generally denotes a software tool or other logic that is used to simulate the behavior of one or more industrial processes, such as those that are controlled by the control system 306. For example, the simulation tool 304 could have access to at least one mathematical model of an industrial process. Each model mathematically defines a modeled behavior of one or more process variables in the industrial process. Ideally, the modeled behavior of a model perfectly represents the actual behavior of one or more process variables in an industrial process, although in reality there is typically some error in the representation. Models could define both the steady-state and dynamic behaviors of the industrial process. The simulation tool 304 could use the model(s) to predict how the industrial process will behave given certain process variable values and changes in those process variable values. The simulation tool 304 can be used by users to perform process design, performance monitoring, troubleshooting, business planning, and asset management. The simulation tool 304 includes any suitable logic for simulating an industrial process. The simulation tool 304 could, for instance, denote the UNISIM software suite from HONEYWELL INTERNATIONAL INC.

In this particular example, the simulation tool 304 includes an alarm manager function 314, which is used to identify simulated alarms that are generated based on the simulated operation of an industrial process. For example, during simulation of an industrial process by the simulation tool 304, the behaviors of process variables associated with the industrial process are simulated using the mathematical model(s). The simulated behavior of a process variable could cause the process variable's value to violate one of the process variable's high or low limits. The alarm manager function 314 can determine whether the properties of any defined alarms are satisfied and generate simulated alarms based on that determination.

An interface 316 is used to facilitate data transfers between the alarm management tool 302 and the simulation tool 304. Any suitable data can be transferred between the alarm management tool 302 and the simulation tool 304. This can include modified alarm or controller properties sent from the alarm management tool 302 to the simulation tool 304. This could also include simulated alarms generated based on those modified alarm or controller properties sent from the simulation tool 304 to the alarm management tool 302.

Any suitable interface 316 could be used here to transfer data. In some embodiments, an application programming interface (API), such as a web service, can be provided so that the alarm management tool 302 is able to automatically transfer data to and receive data from the simulation tool 304. The data could include data defining input variables that are to be provided to the simulation tool 304 and output variables that are to be received from the simulation tool 304. The data could also include data defining a number of case studies to be run by the simulation tool 304, such as case studies involving different alarm or controller properties. For each case study, the associated input values are received by the simulation tool 304, the simulation tool 304 performs its simulations using the associated alarm or controller properties, and the simulation tool 304 reports the values of the associated output variables and any simulated alarms. The data can also be sent between the tools 302 and 304 in any suitable format, such as in one or more flat files.

The output of the simulation tool 304 can be used in any suitable manner. For example, output of the simulation tool 304 can be provided to a visualization tool for display to a user. As a particular example, after a user has modified one or more properties of an alarm or controller, the simulation tool 304 can run simulations based on similar process conditions to those actually found in the system being monitored to identify what alarms would have been generated had the one or more properties been in use. The visualization tool could then present the user with a listing of the simulated alarms that would have been generated, possibly with a comparison of the simulated alarms to the actual alarms that were previously generated.

If the user approves of the simulated behavior, the user can instruct the alarm management tool 302 to provide the modified alarm or controller properties to the control system 306 for actual use. In this way, the user could review how changes to alarms or controllers would affect the alarms generated by a control system before the changes are actually deployed to the control system. Note that the visualization tool used here could be implemented as part of another component in FIG. 3 (such as by the M&R function 308 or other component of the alarm management tool 302) or as a standalone visualization tool 318. Additional details of the operations that can be performed by the various components in FIG. 3 are provided below.

Although FIG. 3 illustrates one example of a functional architecture 300 supporting the rationalization and resolution of alarms in an industrial process control and automation system, various changes may be made to FIG. 3. For example, components could be added, omitted, combined, further subdivided, or placed in any other suitable configuration according to particular needs. As a particular example, the interface 316 could form part of the alarm management tool 302 or the simulation tool 304.

Figure 4:
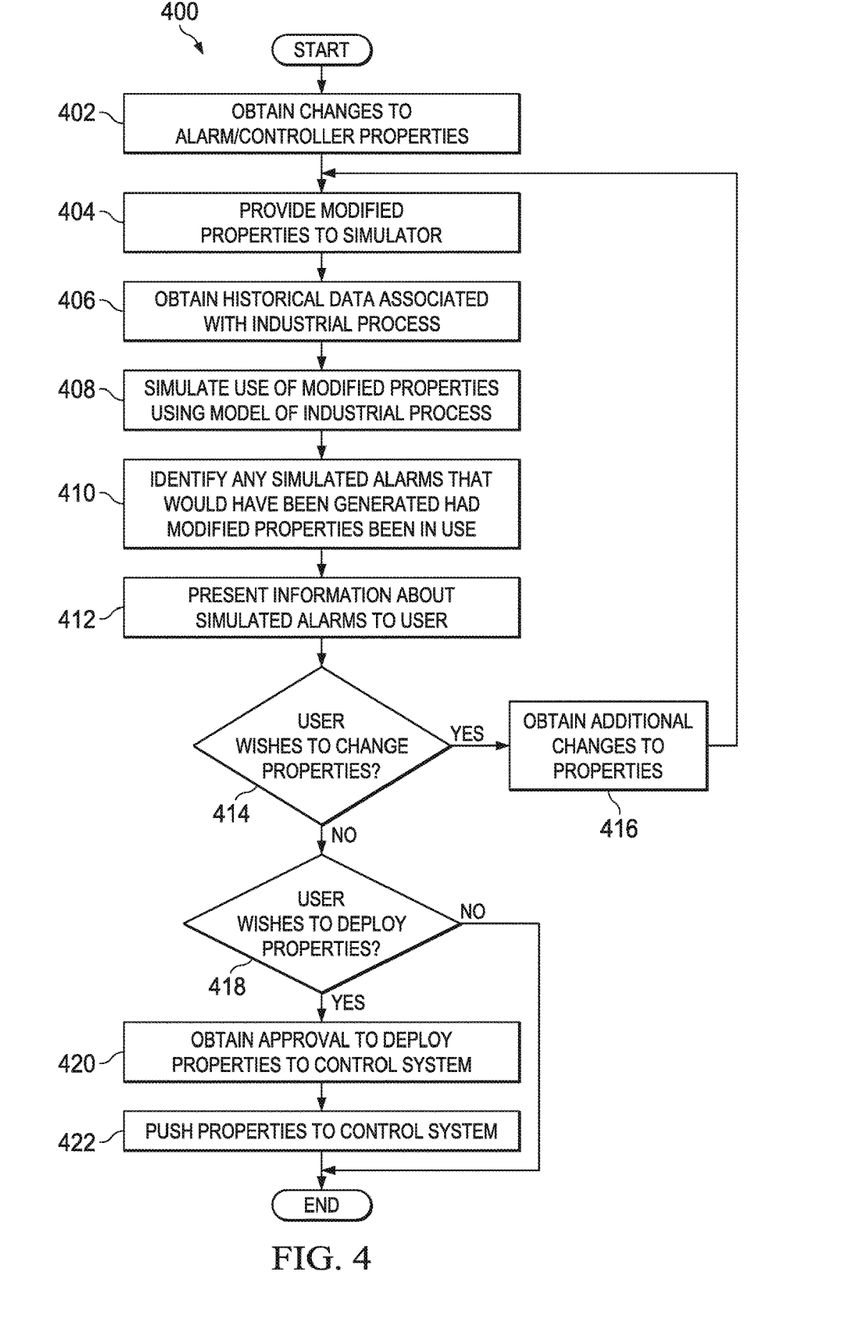
FIG. 4 illustrates an example method for rationalizing and resolving alarms in an industrial process control and automation system according to this disclosure.

FIG. 4 illustrates an example method 400 for rationalizing and resolving alarms in an industrial process control and automation system according to this disclosure. For ease of explanation, the method 400 may be described as being used by the device 200 in FIG. 2 that implements the architecture 300 of FIG. 3. However, the method 400 could be used by any other suitable device and in any suitable system.

As shown in FIG. 4, one or more changes to one or more properties of at least one alarm or controller are obtained at step 402. This could include, for example, the processor 202 of the device 200 executing an alarm management tool 302 that can obtain the current properties of one or more alarms or controllers, such as from a database. The alarm management tool 302 can also receive one or more changes to one or more of those properties, such as via a graphical user interface that displays the current properties and allows a user to enter changes to those properties.

Note that any suitable properties of an alarm or controller could be altered here. In general, the properties that can be modified include properties that affect how or how often an alarm is generated by a control system 306. For instance, a user could change a high or low limit on a process variable, where the high or low limit denotes a maximum or minimum acceptable value for the process variable (and together the high and low limits define an acceptable range of values for the process variable). A user could also change a high or low setting of a deviation alarm, where the high or low limit denotes a maximum or minimum allowable deviation in a process variable. A user could further change a high or low setting for a manipulated variable, where the high or low setting denotes how much the manipulated variable could be altered. A user could also change a high or low setting of a rate of change alarm, where the high or low setting denotes how quickly a process variable can change. A user could further change a dead band for a process variable, where the dead band represents an allowable deviation of the process variable from its setpoint. In addition, a user could change one or more controller tuning parameters, such as one or more gains (like PID gains $K_p$, $K_i$, or $K_d$), a derivative time constant $T_d$, or an integral time constant $T_i$ used by the controller. The operation of the controller in controlling one or more process variables changes based on the tuning parameters, so the alarms generated by the controller can also change since the controller is operating differently to control the process variable(s).

The one or more modified properties are provided to a simulator for use in one or more simulations at step 404, and historical data associated with at least one industrial process could be obtained to identify actual alarms generated by the industrial process(es) at step 406. This could include, for example, the processor 202 of the device 200 executing a simulation tool 304, which can receive the one or more modified properties from the alarm management tool 302 via the interface 316. This could also include the simulation tool 304 retrieving historical data associated with an industrial process from a historian 114 or other data source. The historical data could identify one or more alarms that were actually generated by the control system 306.

The use of the one or more modified properties is simulated using at least one model of the industrial process(es) at step 408, and any simulated alarms are identified at step 410. This could include, for example, the simulation tool 304 running one or more simulations to identify whether any process variable values would have violated a high/low limit or setting or a dead band value modified by a user. This could also include the simulation tool 304 running one or more simulations to identify how a process controller 106 would have operated given one or more tuning parameters modified by a user and what alarms would have been generated based on the use of the tuning parameter(s).

Information about any simulated alarms is presented to a user at step 412. This could include, for example, the simulation tool 304 providing information about any simulated alarms to the alarm management tool 302 or a visualization tool 318 for presentation to a user. The presented information can identify the alarms that could have been generated had the one or more modified properties been in use. The information can be presented in any suitable manner, such as in a list that identifies the simulated alarms and details for the alarms (like the cause of each alarm and one or more process variable values). The presented information could also include the actual alarms previously generated by the control system. The user could then review the results, compare the results to the actual alarms generated during the historical period, review key performance indicators (KPIs) associated with a controller 106, or perform other actions. As a particular example, the user could review the results and make a determination whether the number(s) and type(s) of simulated alarm(s) is acceptable.

A determination is made whether the user wishes to make additional changes to the same property or properties or to a different property or properties at step 414. If so, one or more additional changes are obtained at step 416. This could include, for example, the alarm management tool 302 receiving one or more additional changes to one or more high/low limits, high/low settings, dead bands, or controller tuning parameters. The process then returns to step 404 to perform additional simulations using the additional changes.

If the user does not wish to make further changes, a determination is made whether the user wishes to deploy the modified property or properties to a control system at step 418. If so, approval could be obtained for deploying the one or more modified properties at step 420, and the one or more modified properties are pushed to a control system at step 422. This could include, for example, the user requesting that the changes to the properties be approved by a supervisor or other personnel and providing the simulation results as a justification. Once approved, the pushing of the one or more modified properties could include providing the one or more alarm properties or controller tuning parameters to one or more controllers 106 or other components of the control system 306. At this point, those components can operate using the modified properties. Ideally, those components would generate alarms in a manner identical or similar to the simulated behavior. If the modified properties were made for alarm rationalization purposes, those components could generate fewer alarms for review by human operators.

Note that, in some embodiments, at least one of the controllers 106 may be configured to operate in different states or operational modes. For example, a controller could include a normal mode of operation and a "feed change" mode of operation. The normal mode of operation could be associated with operation of industrial equipment that is processing one or more relatively consistent flows of one or more input materials. The "feed change" mode of operation could be associated with operation of industrial equipment when one or more input materials are changing, such as from one type or grade of input material to another type or grade of input material. A feed change typically involves some expected perturbations of process variables. It may be desirable that normal process variable perturbations during a feed change would not lead to the generation of alarms or would lead to the generation of fewer alarms. In these embodiments, the different states or operational modes could have different alarm settings, and the method 400 could be repeated using the different alarm settings for the different states or operational modes. The deployment of the modified property or properties could take the form of updating one or more parameters for one or more existing states or operational modes or creating one or more new states or operational modes.

Although FIG. 4 illustrates one example of a method 400 for rationalizing and resolving alarms in an industrial process control and automation system, various changes may be made to FIG. 4. For example, while shown as a series of steps, various steps in FIG. 4 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for rationalizing and resolving alarms in an industrial process control and automation system, the method comprising:
    obtaining, by an alarm management tool, one or more modified properties associated with at least one of (i) an alarm to be generated by the industrial process control and automation system and (ii) a process controller within the industrial process control and automation system;
    obtaining, by a simulation tool, historical data associated with actual operation of the industrial process control and automation system;
    simulating, by the simulation tool, operation of one or more components of the industrial process control and automation system using the one or more modified properties;
    identifying, by an alarm manager function of the simulation tool, one or more simulated alarms generated during the simulated operation of the one or more components using the one or more modified properties; and
    outputting, to a visualization tool, the one or more simulated alarms,
    wherein the alarm management tool generates alerts or one or more notifications before the alarms are triggered in the industrial process control and automation system.

2. The method of claim 1, further comprising:
    receiving one or more approvals of the one or more modified properties; and
    providing the one or more modified properties to the process controller for use in the industrial process control and automation system.

3. The method of claim 1, further comprising:
    identifying one or more actual alarms generated by the industrial process control and automation system; and
    outputting the one or more actual alarms for comparison with the one or more simulated alarms.

4. The method of claim 1, wherein the one or more modified properties cause the process controller to generate fewer alarms using the one or more modified properties compared to when the process controller uses one or more initial properties.

5. The method of claim 1, wherein the one or more modified properties comprise at least one of a high limit or setting, a low limit or setting, and a dead band associated with alarm settings of one or more process variables.

6. The method of claim 1, wherein the one or more modified properties comprise at least one tuning parameter of the process controller.

7. The method of claim 6, wherein the at least one tuning parameter comprises one or more of: a proportional gain, an integral gain, a derivative gain, a derivative time constant, or an integral time constant used by the process controller.

8. The method of claim 1, further comprising:
    obtaining one or more additional properties associated with at least one of the alarm and the process controller;
    simulating operation of the one or more components using the one or more additional properties;
    identifying one or more additional simulated alarms generated during the simulated operation of the one or more components using the one or more additional properties; and
    outputting the one or more additional simulated alarms.

9. The apparatus of claim 8, wherein the historical data comprises one or more alarms actually generated by the industrial process control and automation system.

10. The method of claim 1, wherein:
    the process controller has different states or operational modes;
    the one or more modified properties comprise one or more modified properties for each state or operational mode;
    identifying the one or more simulated alarms comprises identifying one or more simulated alarms for each state or operational mode; and
    outputting the one or more simulated alarms comprises outputting the one or more simulated alarms for each state or operational mode.

11. An apparatus for rationalizing and resolving alarms in an industrial process control and automation system, the apparatus comprising:
    at least one memory configured to store:
        one or more modified properties, using an alarm management tool, associated with at least one of (i) an alarm to be generated by an industrial process control and automation system and (ii) a process controller within the industrial process control and automation system; and
        historical data, using a simulation tool, associated with actual operation of the industrial process control and automation system; and
    at least one processing device configured to:
        simulate, using a simulation tool, operation of one or more components of the industrial process control and automation system using the one or more modified properties;
        identify, using an alarm manager function of the simulation tool, one or more simulated alarms generated during the simulated operation of the one or more components using the one or more modified properties; and
        output, to a visualization tool, the one or more simulated alarms,
    wherein the alarm management tool generates alerts or one or more notifications before the alarms are triggered in the industrial process control and automation system.

12. The apparatus of claim 9, wherein the at least one processing device is further configured to:
    receive one or more approvals of the one or more modified properties; and
    provide the one or more modified properties to the process controller for use in the industrial process control and automation system.

13. The apparatus of claim 9, wherein the one or more modified properties are configured to cause the process controller to generate fewer alarms using the one or more modified properties compared to when the process controller uses one or more initial properties.

14. The apparatus of claim 9, wherein the one or more modified properties comprise at least one of a high limit or setting, a low limit or setting, and a dead band associated with alarm settings of one or more process variables.

15. The apparatus of claim 9, wherein the one or more modified properties comprise at least one tuning parameter of the process controller.

16. The apparatus of claim 9, wherein the at least one processing device is further configured to:
    obtain one or more additional properties associated with at least one of the alarm and the process controller;
    simulate operation of the one or more components using the one or more additional properties;
    identify one or more additional simulated alarms generated during the simulated operation of the one or more components using the one or more additional properties; and
    output the one or more additional simulated alarms.

17. A non-transitory computer readable medium containing computer readable program code that when executed causes at least one processing device to:
    obtain, using an alarm management tool, one or more modified properties associated with at least one of (i) an alarm to be generated by an industrial process control and automation system and (ii) a process controller within the industrial process control and automation system;
    obtain, using a simulation tool, historical data associated with actual operation of the industrial process control and automation system;
    simulate, using the simulation tool, operation of one or more components of the industrial process control and automation system using the one or more modified properties;
    identify, using an alarm manager function of the simulation tool, one or more simulated alarms generated during the simulated operation of the one or more components using the one or more modified properties; and
    output, to a visualization tool, the one or more simulated alarms,
    wherein the alarm management tool generates alerts or one or more notifications before the alarms are triggered in the industrial process control and automation system.

18. The non-transitory computer readable medium of claim 17, further containing computer readable program code that when executed causes the at least one processing device to:
    receive one or more approvals of the one or more modified properties; and
    provide the one or more modified properties to the process controller for use in the industrial process control and automation system.

19. The non-transitory computer readable medium of claim 17, wherein the one or more modified properties comprise at least one of a high limit or setting, a low limit or setting, and a dead band associated with alarm settings of one or more process variables.

20. The non-transitory computer readable medium of claim 17, wherein the one or more modified properties comprise at least one tuning parameter of the process controller.

21. The non-transitory computer readable medium of claim 17, further containing computer readable program code that when executed causes the at least one processing device to:
- obtain one or more additional properties associated with at least one of the alarm and the process controller;
- simulate operation of the one or more components using the one or more additional properties;
- identify one or more additional simulated alarms generated during the simulated operation of the one or more components using the one or more additional properties; and
- output the one or more additional simulated alarms.

* * * * *